United States Patent

Uehara

[11] Patent Number: 5,063,594
[45] Date of Patent: Nov. 5, 1991

[54] VIDEO SIGNAL SCRAMBLING SYSTEM

[75] Inventor: Shouji Uehara, Konosu, Japan

[73] Assignee: Kabushiki Kaisha Toshiba, Kawasaki, Japan

[21] Appl. No.: 501,725

[22] Filed: Mar. 30, 1990

[30] Foreign Application Priority Data

Mar. 31, 1989 [JP] Japan .................................. 1-83603

[51] Int. Cl.$^5$ ............................................ H04N 7/167
[52] U.S. Cl. ......................................... 380/15; 380/19
[58] Field of Search ................... 380/7, 10, 15, 19, 20, 380/236

[56] References Cited

U.S. PATENT DOCUMENTS 4,839,922  6/1989  Imasaki et al. ........................ 380/15
4,901,351  2/1990  Tanaka et al. ........................ 380/15

Primary Examiner—Bernarr E. Gregory
Attorney, Agent, or Firm—Cushman, Darby & Cushman

[57] ABSTRACT

A system for level-compressing a sync signal component of a video intermediate frequency signal to scramble the signal. A compression pulse generation circuit generates a compression pulse in synchronism with a sync signal. A level compression circuit level compresses the sync signal component of the video intermediate frequency signal in response to the compression pulse. A sine wave generation circuit generates a sine wave having a frequency n times that of the sync signal in synchronism with the sync signal. A control data generation circuit generates control data for controlling a phase of the sine wave and generates a sine wave phase-controlled in accordance with the control data. A superposing circuit superposes the phase-controlled sine wave on an audio intermediate frequency signal and outputs a superposed signal. An output circuit outputs the level-compressed signal and the audio intermediate frequency signal. A detector detects the superposed signal and extracts the sine wave. A compression position detector detects a compression position and outputs a detection signal. An expansion pulse generation circuit generates an expansion pulse on the basis of the sine wave and the detection signal. A level expansion circuit expands the sync signal component in response to the expansion pulse.

20 Claims, 6 Drawing Sheets

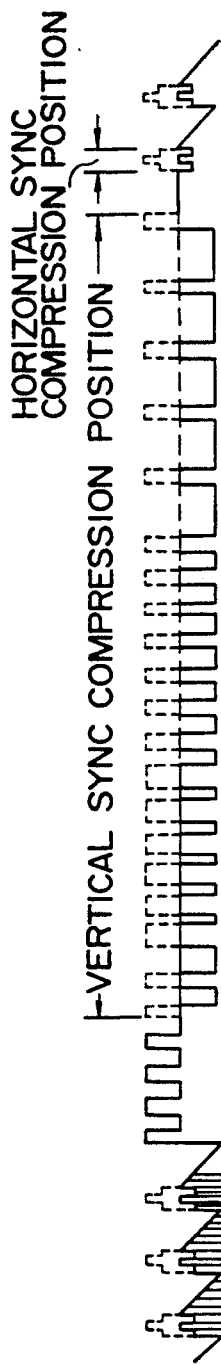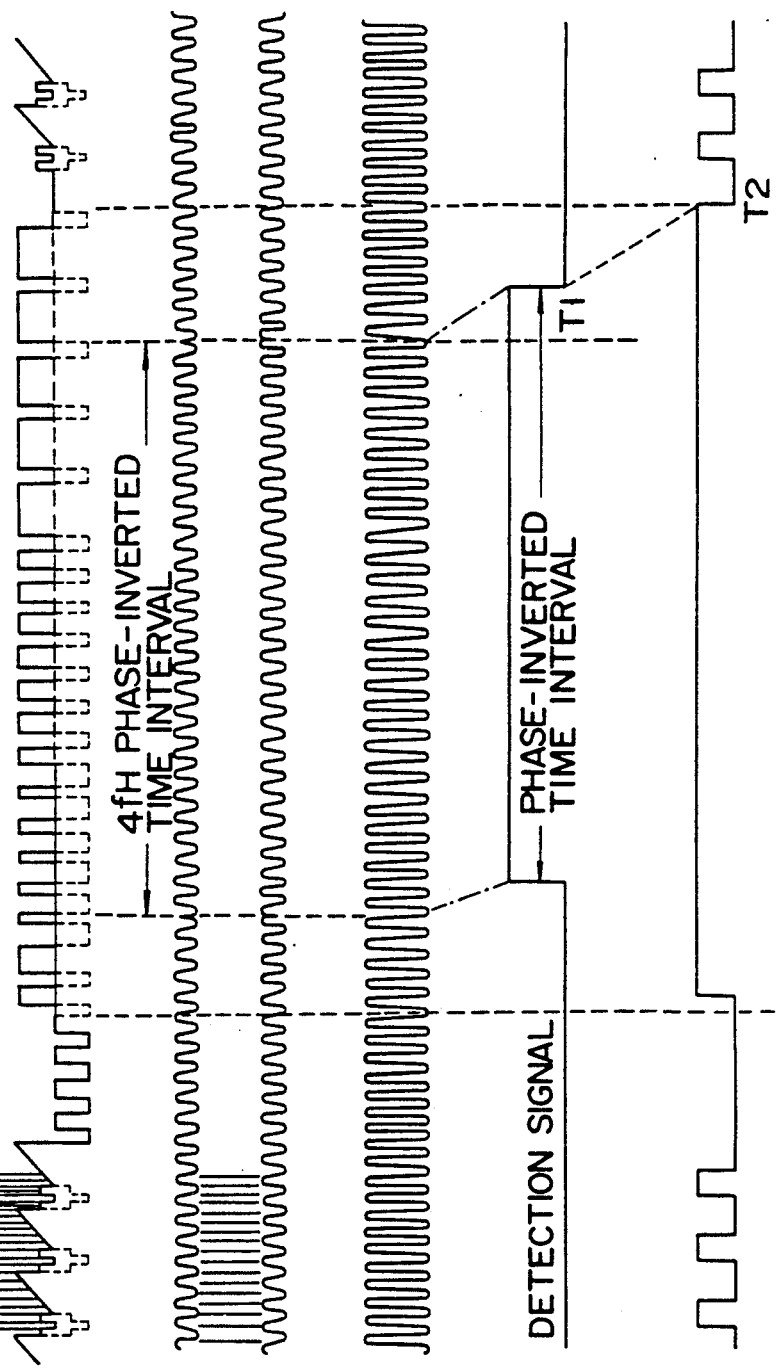
FIG. 2A
FIG. 2B
FIG. 2C
FIG. 2D
FIG. 2E

| PHASE-INVERTED TIME INTERVAL | DATA (MEANING) |
|---|---|
| 9H (36 COUNT) | SYNC BIT |
| 6H (24 COUNT) | DATA 0 |
| 3H (12 COUNT) | DATA 1 |

FIG. 3

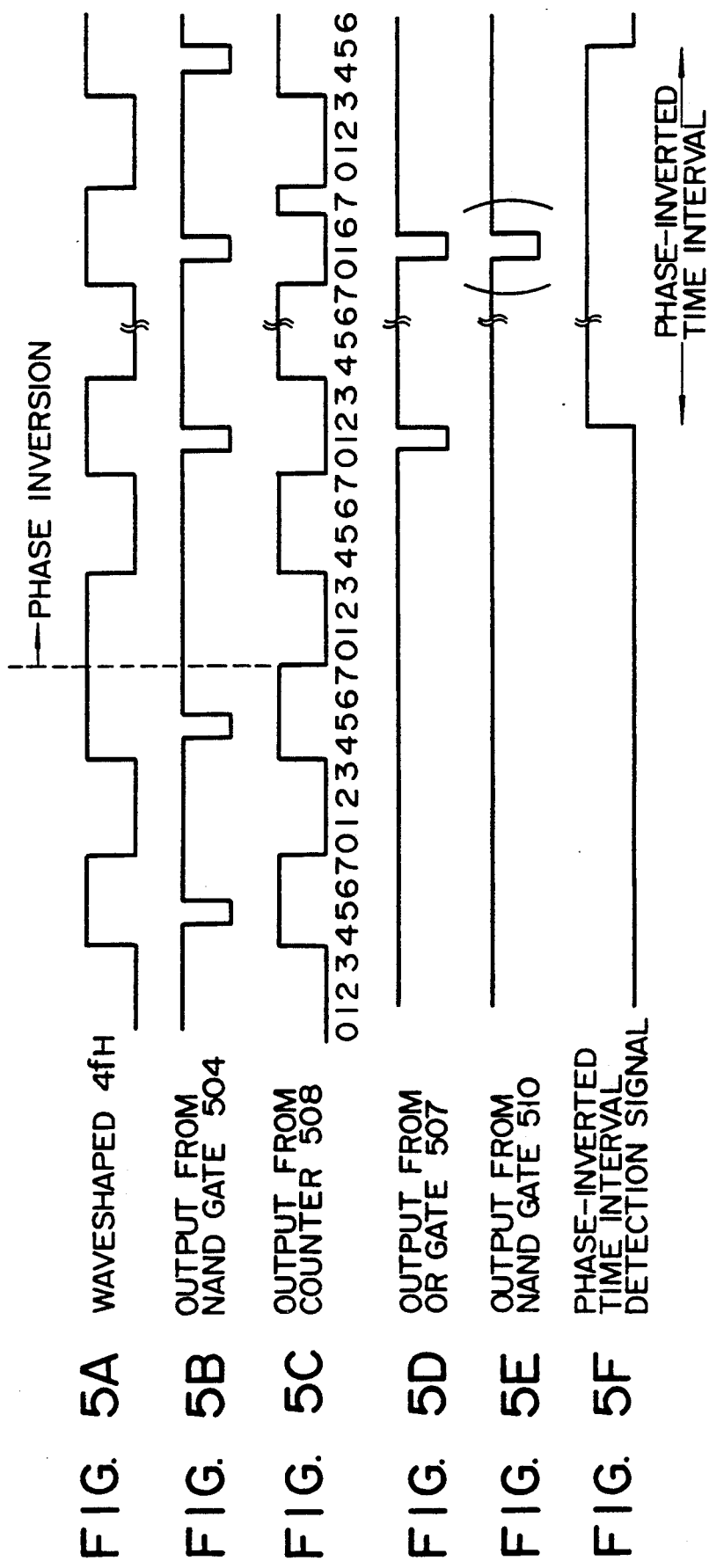

VIDEO SIGNAL SCRAMBLING SYSTEM

BACKGROUND OF THE INVENTION

1. Field of the Invention

The present invention relates to a video signal scrambling system and, more particularly, to a video signal scrambling system used upon broadcasting of a subscription TV, and preventing illegal reception more effectively.

2. Description of the Related Art

In a pay TV broadcasting system, in order to prevent illegal reception by a person who does not subscribe for the pay TV, video signals are scrambled and transmitted. On the receiver side, the scrambled signals are decoded to reproduce a normal video signal.

In an example of a conventional scrambling technique, a transmitting unit transmits a video intermediate frequency signal obtained by level-compressing a sync signal component; the transmitting unit also transmits scrambling data obtained by AM-modulating an audio intermediate frequency signal to inform the compression position to the receiving unit. On the receiving side, this audio intermediate frequency signal is AM-detected to reproduce the scrambling data, thus determining the compression position of the sync signal. A sync signal component corresponding to the compression position is expanded.

In such a scrambling technique, since a pulse with a rectangular wave is superposed on the audio intermediate frequency signal when the scrambling data is transmitted, a trigger pulse may be mixed in the audio signal itself to undesirably generate a buzz.

A system which solves the above problem is disclosed in Japanese Patent Application No. 62-223348 (U.S. Pat. No. 4,901,361 to Taneka et al, issued Feb. 13, 1990) assigned to the assignee of the present invention.

In this system, two sine waves, i.e., fH (horizontal frequency) and nfH, are combined to produce scrambling data. The scrambling data is superposed on an audio intermediate frequency signal, and the obtained data is transmitted. In the receiving unit, the audio intermediate frequency signal is AM-detected to separate the signal into two sine waves, i.e., fH and nfH. The contents of the scrambling data are checked in accordance with the combination of the two sine waves to determine the sync compression position, and an expansion pulse is obtained based on the determined position.

In such a scrambling technique, fH and nfH sine waves must be generated and detected (in the receiving unit) with high precision. In addition, since the accurate phase relationship between the fH and nfH waves is required, high precision with respect to a slice level upon detection is also required. Therefore, an expensive circuit is required as the entire system.

SUMMARY OF THE INVENTION

It is an object of the present invention to provide a video signal scrambling system which can realize a low-cost circuit arrangement.

It is another object of the present invention to provide a video signal scrambling system which can overcome an adverse effect on audio and video signals when scrambling data is superposed on an audio intermediate frequency signal to descramble a video intermediate frequency signal.

In order to achieve the above objects, according to the present invention, there is provided a video signal scrambling system comprising:

a transmitting unit including:

compression pulse generating means for generating a compression pulse in synchronism with a sync signal;

level compressing means for level-compressing a sync signal component of a video intermediate frequency signal in response to the compression pulse generated by the compression pulse generating means, and outputting a level-compressed signal;

sine wave generating means for generating a sine wave having a frequency n times a frequency of the sync signal in synchronism with the sync signal;

control data generating means for generating control data for controlling the phase of the sine wave generated by the sine wave generating means in order to generate a phase-controlled sine wave, the phase-controlled sine wave including data representing a position at which the sync signal component is level-compressed;

superposing means for superposing the phase-controlled sine wave from the control data generating means on an audio intermediate frequency signal and outputting a superposed signal; and outputting means for outputting the level-compressed signal from the level compressing means and the superposed signal output from the superposing means; and a receiving unit including:

detecting means for detecting the superposed signal output from the superposing means and extracting the sine wave;

compression position detecting means for detecting the position of the sync signal component compressed by the level compressing means and outputting a detection signal;

expansion pulse generating means for generating an expansion pulse at a timing determined on the basis of the sine wave extracted by the detecting means and the detection signal output from the compression position detecting means; and level expanding means for expanding the sync signal component level-compressed by the level compressing means in response to the expansion pulse generated from the expansion pulse generating means.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIGS. 1A and 1B are block diagrams showing an arrangement of a video signal scrambling system according to an embodiment of the present invention, in which FIG. 1A shows a transmitting unit, and FIG. 1B shows a receiving unit;

FIGS. 2A to 2E are signal waveform charts for explaining a scrambling technique according to the system of the present invention;

FIG. 3 is a table showing an example of scrambling data employed in the system of the present invention;

FIGS. 5A to 5F are waveform charts of signals from each unit in the circuit shown in FIG. 4.

DETAILED DESCRIPTION OF THE PREFERRED EMBODIMENT

An embodiment of the present invention will be described hereinafter with reference to the accompanying drawings.

Figure 1A:
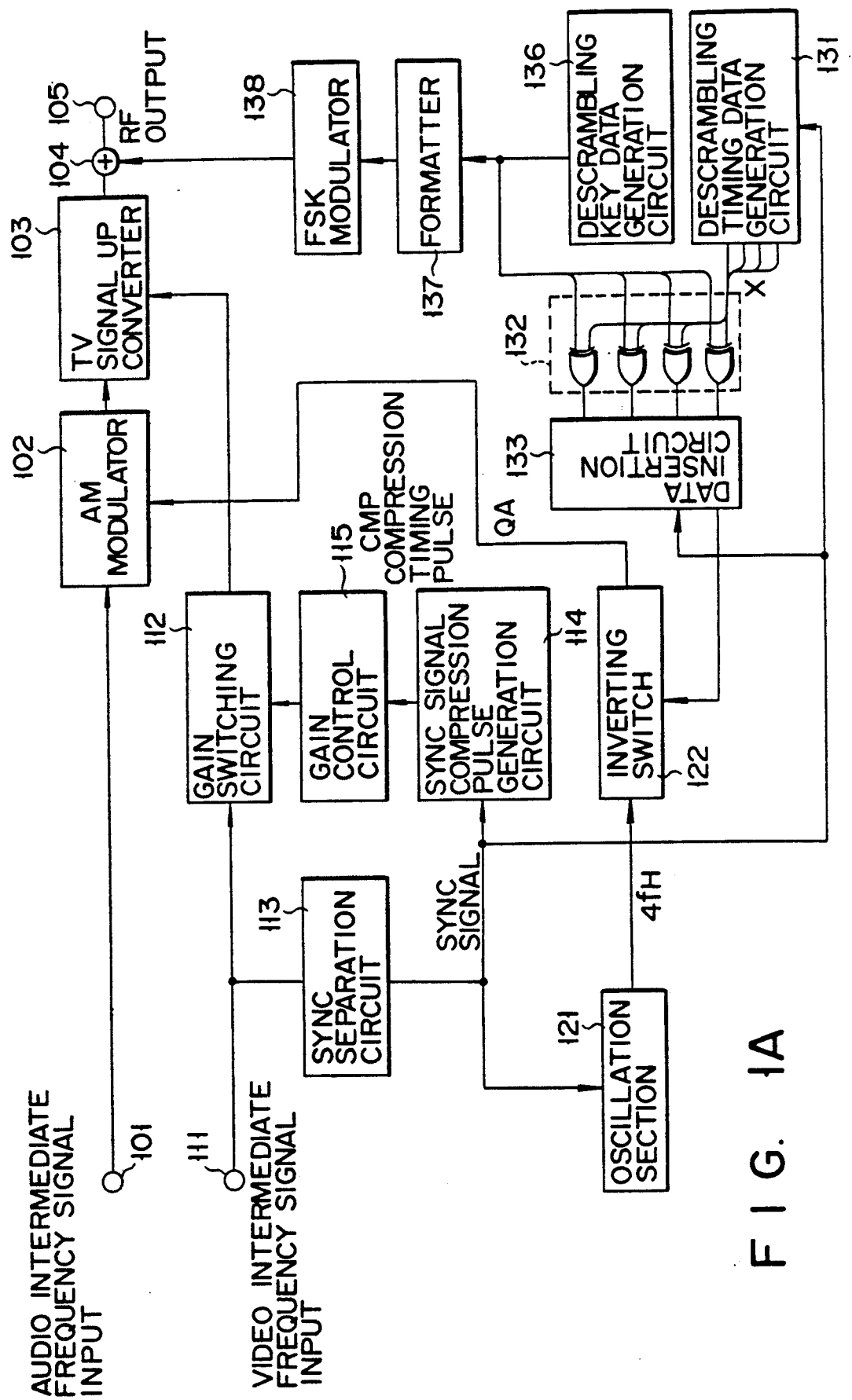
Figure 1B:
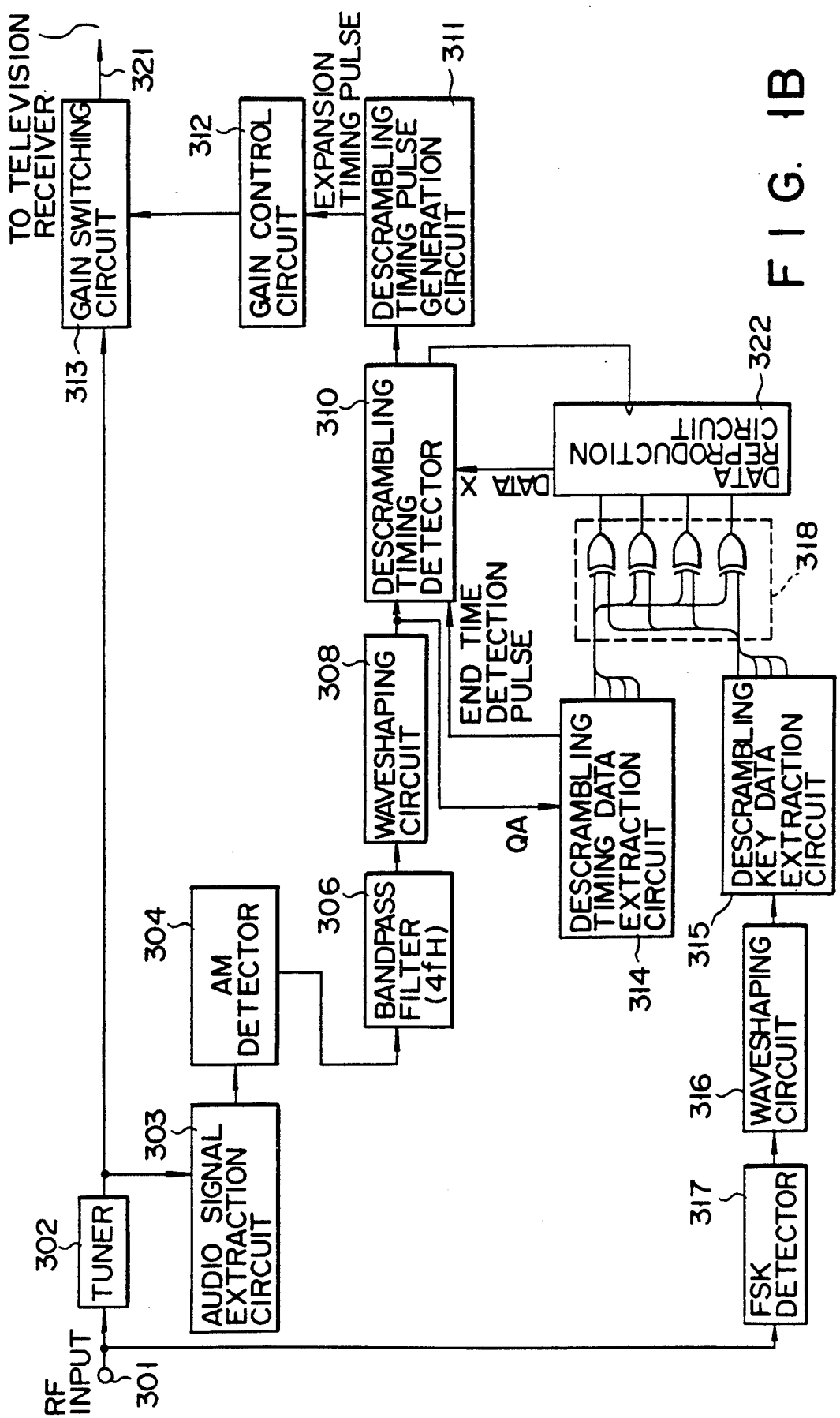

FIGS. 1A and 1B show an embodiment of the present invention, in which FIG. 1A shows a transmitting unit, and FIG. 1B shows a receiving unit.

In FIG. 1A, an input terminal 101 receives an audio intermediate frequency signal, and an input terminal 111 receives a video intermediate frequency signal. The video intermediate frequency signal is supplied to a sync separation circuit 113 and a gain switching circuit 112. A sync signal extracted by the sync separation circuit 113 is supplied to a sync signal compression pulse generation circuit 114, and is used for a timing to level-compress a sync signal position. The sync signal compression pulse generation circuit 114 produces a compression timing pulse CMP in synchronism with the sync signal, and supplies the pulse CMP to a gain control circuit 115. When the compression timing pulse CMP is input to the gain control circuit 115, a gain control signal is supplied to the control terminal of the gain switching circuit 112 to compress the sync signal position of the video intermediate frequency signal by 6 dB level. The video intermediate frequency signal which is sync-compressed by the gain switching circuit 112, i.e., which is scrambled, is supplied to a television signal up converter 103.

The television signal up converter 103 also receives the audio intermediate frequency signal from an AM modulator 102. The up converter 103 converts the frequencies of the input signals into transmitting frequencies, and supplies the frequency-controlled signals to an RF output terminal 105 through a mixer 104. The AM modulator 102 superposes a superposed signal used to inform the level compression position of the video intermediate frequency signal to the receiving side on the audio intermediate frequency signal. In other words, the AM modulator 102 superposes the scrambling data.

In order to produce the scrambling data, an nfH oscillation section 121, an inverting switch 122, a data insertion circuit 133, an exclusive OR circuit 132, a descrambling key data generation circuit 136, and a descrambling timing data generation circuit 131 are used.

The nfH oscillation section 121 oscillates an nfH (fH represents a horizontal frequency) sine wave (to be referred to as an nfH signal hereinafter) in synchronism with a sync signal from the sync separation circuit 113. The nfH signal is supplied to the inverting switch 122. The inverting switch 122 inverts or re-inverts the phase of the nfH signal on the basis of the control data from the data insertion circuit 133, and outputs the inverted signal. This signal is supplied to the modulation signal input terminal of the AM modulator 102 as encoded data QA.

A switching timing at the above-mentioned inverting switch 122 is determined on the basis of the data produced by supplying output data X (representing the compression position of the sync signal) from the descrambling timing data generation circuit 131 to the exclusive OR circuit 132 for performing encoding in accordance with key data from the descrambling key data generation circuit 136. The encoded data QA is a signal for informing when the compression timing signal is generated from the sync signal compression pulse generation circuit 114 to the receiving unit. Even if the encoded data QA can be extracted in the receiving unit, the extracted data cannot be used for descrambling. When this encoded data QA is extracted in the receiving unit, the encoded data QA is decoded to reproduce the data X representing the sync compression position, thus determining a generation timing of an expansion pulse on the basis of the data X. This is because the data X representing the sync compression position is encoded in the exclusive OR circuit 132 in accordance with the key data from the descrambling key data generation circuit 136.

In order to decode the encoded data, therefore, the key data from the descrambling key data generation circuit 136 is also required in the receiving unit. For this reason, the key data is transmitted to the receiving unit through a formatter 137 for formatting a data format an FSK modulator 138 for performing frequency shift keying (FSK) modulation, and the mixer 104.

FIG. 1B shows an arrangement of the receiving unit.

The scrambled video intermediate frequency signal and the FSK-modulated signal are supplied to an RF input terminal 301. In a tuner 302, the video and audio intermediate frequency signals are selected. The audio intermediate frequency signal is extracted by an audio signal extraction circuit 303, and is detected by an AM detector 304. An nfH signal detected by the detector 304 is extracted by a bandpass filter 306. This nfH signal includes the encoded data QA produced in FIG. 1A.

The nfH signal is waveshaped by a waveshaping circuit 308, and is input to a descrambling timing detector 310 and a descrambling timing data extraction circuit 314.

On the other hand, the FSK-modulated signal is detected by an FSK detector 317, and the detected output is waveshaped by a waveshaping circuit 316. The waveshaped output is input to and stored in a descrambling key data extraction circuit 315. Therefore, when decoding is performed by an exclusive OR circuit 318 using the key data and a time interval signal detected by the descrambling timing data extraction circuit 314, the data X representing the sync compression position can be obtained. This data is stored in a data reproduction circuit 322.

The data X representing the sync compression position obtained by the data reproduction circuit 322 is input to the descrambling timing detector 310. The descrambling timing detector 310 determines a timing to generate the expansion pulse using the data X representing the sync compression position. In accordance with this determination, a descrambling timing pulse generation circuit 311 generates an expansion pulse. The expansion pulse is supplied to a gain control circuit 312. The gain control circuit 312 controls a gain of a gain switching circuit 313, and expands a level-compressed position of the video intermediate frequency signal obtained from the tuner 302. Therefore, the descrambled video intermediate frequency signal can be obtained at an output terminal 321.

FIGS. 2A and 2B respectively show a video intermediate frequency signal which is obtained by level-compressing the position corresponding to a sync signal component, i.e., which is scrambled, and an audio intermediate frequency signal on which scrambling data is superposed to descramble the scrambled data.

An nfH signal is used as a signal for transmitting the scrambling data. In this nfH signal, the length of each phase-inverted time interval represents the content of the corresponding data. FIG. 2C shows the nfH signal, and FIG. 2D shows a phase-inverted time interval of the nfH signal. FIG. 2E shows the positions of original vertical and horizontal sync signals of the video signal shown in FIG. 2A.

An end time T1 of the phase-inverted time interval and an end time T2 of a vertical sync signal time interval have a predetermined relationship. When the end time T1 of the phase-inverted time interval is determined, the vertical sync time interval can be automatically determined.

In addition, the end time T1 of the phase-inverted time interval and a zero-crossing point of the nfH signal are utilized as reference timings of the system. More specifically when the zero-crossing point of the nfH signal is counted from the end time T1, the subsequent vertical sync time interval can be detected. Furthermore, a value obtained by counting the zero-crossing point of the nfH signal from the end time T1 can be utilized for reference to obtain an expansion timing signal of the horizontal sync signal.

Moreover, the length of the phase-inverted time interval represents the contents of the data.

FIG. 3 shows an example of the arrangement of the length of the phase-inverted time interval and the contents of the data. If the length of the phase-inverted time interval corresponds to 9H (H denotes a period of the horizontal sync signal), it represents a sync bit; 6H, data "0"; and 3H, data "1".

This data is output from the exclusive OR circuit 132 on the transmitting side. The data insertion circuit 133 sets a phase-inverted time interval on the basis of this data. On the receiving side, the above data is extracted by the descrambling timing data extraction circuit 314. This data is encoded in accordance with the key data. Therefore, in order to obtain original data (output from the descrambling timing data generation circuit 131 o the transmitting side) directly representing a sync compression position, the encoded data must be decoded using the key data on the receiving side. The exclusive OR circuit 318 and the data reproduction circuit 322 perform the decoding processing.

Figure 4:
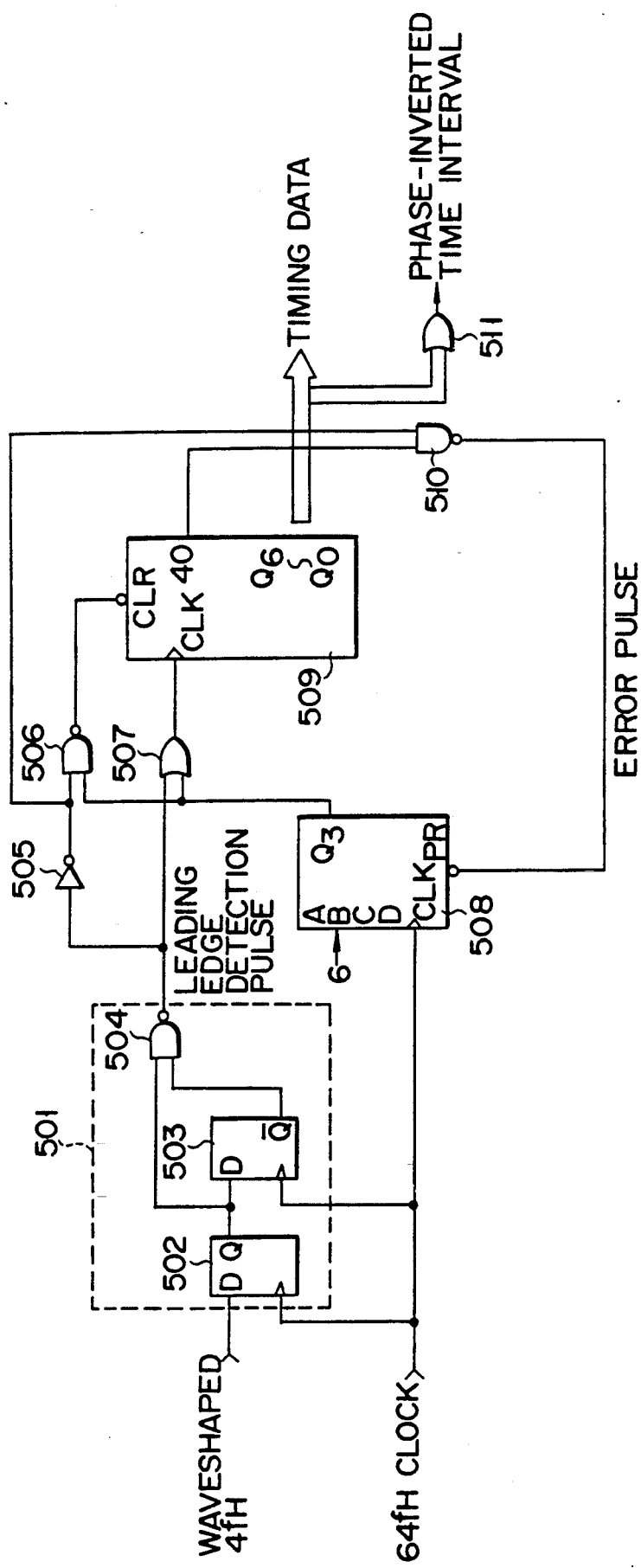
FIG. 4 is a circuit diagram showing an arrangement of a descrambling timing data extraction circuit shown in FIG. 1.

FIG. 4 shows the inside of the descrambling timing data extraction circuit 314, and FIGS. 5A to 5F show waveforms of the signals from each unit in the circuit 314.

The waveshaped nfH signal (FIG. 5A) is input to a leading edge detector 501. In this embodiment, n=4. The leading edge detector 501 includes latch circuits 502 and 503 driven by a 64fH clock, and a NAND gate 504. The data input terminal of the latch circuit 502 receives a 4fH signal, and an output from the latch circuit 502 is input to the latch circuit 503. An output from the latch circuit 502 and an inverted output from the latch circuit 503 are supplied to the NAND gate 504. A leading edge detection pulse (FIG. 5B) output from the NAND gate 504 is supplied to one input terminal of a NAND gate 506 through an inverter 505, and is also supplied to one input terminal of an OR gate 507. The other input terminal of each of the NAND and OR gates 506 and 507 receives a comparison pulse (FIG. 5C) having a predetermined period from a counter 508. The counter 508 receives a clock having a frequency of 64fH to be operated. However, this counter is equivalent as a counter which receives a clock having a frequency of 4fH/8 to be operated because of setting of a divided frequency inside, and outputs the above-mentioned comparison pulse. An output from the NAND gate 506 is supplied to the clear terminal of a counter 509, and an output (FIG. 5D) from the OR gate 507 is supplied to the clock input terminal of the counter 509.

An output from the inverter 505 and an upper-bit output from the counter 509 are supplied to a NAND gate 510. The NAND gate 510 detects a phase shift, and an output (FIG. 5E) detected by the gate 510 presets the counter 508.

Output data (FIG. 5F) from the counter 509 is output to the phase-inverted time interval of the 4fH signal. The count value of the counter 509 corresponds to the phase-inverted time interval shown in FIG. 3, and is converted into data. More specifically, when the count value is 36, data is a sync bit; 24, "0"; and 12, "1". A phase-inverted time interval signal can be obtained by calculating a logic sum of output bits 0 to 6 from the counter 509 by an OR gate 511.

As shown in FIG. 5C, assuming that the position of a half cycle of the 4fH signal is a reference position, the time interval between the adjacent horizontal sync signals can be equally divided into eight intervals. In addition, assuming that the start position of the eight-divided time intervals and the phase-inverted time interval signal (FIG. 5F) is defined as "0", the positions 0 to 7 can be continuously defined at a cycle of fH. On the transmitting side, the sync signal is compressed at an arbitrary position of the positions 0 to 7 and the data representing the position is transmitted to the receiving side as descrambling data.

On the receiver side, the phase-inverted and non-phase-inverted time intervals are often erroneously recognized. The NAND gate 510 corrects such a recognition error. More specifically, if the non-phase-inverted and phase-inverted time intervals are erroneously recognized, the counter 509 counts up to the counter value of the sync bit or more. In this embodiment, when the count value is increased up to 40, the NAND gate 510 presets the counter 508. Thus, since a phase-inverted time interval of the video time interval is corrected into a non-phase-inverted time interval, the counter 508 can recognize the subsequent phase-inverted time interval.

As described above, in the reproduced data, the encoded state is descrambled by the key data, and the descrambled data is input to the descrambling timing detector 310. The detector 310 counts, by using a leading edge of the nfH signal with reference to the zero-crossing point of the nfH signal after an end pulse of the phase-inverted time interval is input thereto from the descrambling timing data extraction circuit 314. The time when the count value coincides with the reproduced data received from the data reproduction circuit 322 is defined as a compression position of, e.g., a horizontal sync signal, and an expansion timing pulse is output. The pulse width of the expansion timing pulse is determined by, e.g., a monostable multivibrator since the horizontal sync period is known in advance.

In FIGS. 2A to 2E, the phase-inverted time internal of the nfH signal is present in the vertical sync time interval. In this case, with reference to the end time of the phase-inverted time interval signal, an expansion pulse of the subsequent compressed horizontal sync signal can be produced. In addition, when the phase-inverted time interval of the nfH signal is detected at a position different from the vertical sync signal time interval, the position of the compressed horizontal sync signal is detected using the reproduced data to obtain the expansion timing pulse of the horizontal sync position, as described above. This timing pulse is periodically output until the subsequent reproduced data having a different content is obtained. More specifically, when the reproduced data coincides with the count value of the leading edge of the nfH signal, the expansion timing pulse is obtained, and the counter is cleared to perform the subsequent counting operation.

As has been described above, according to the present invention, when scrambling data to descramble a video intermediate frequency signal is superposed on an audio intermediate frequency signal, only a sine wave of the nfH signal which does not adversely affect the audio and video signals are utilized, thereby realizing a low-cost apparatus.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A video signal scrambling system comprising:
    a transmission unit including:
        a first signal source for generating an audio intermediate frequency signal;
        a second signal source for generating a video intermediate frequency signal including a sync signal;
        compression pulse generating means for generating a compression pulse in synchronism with the sync signal of the video intermediate frequency signal generated from said second signal source;
        level compressing means for level-compressing a sync signal component of the video intermediate frequency signal in response to the compression pulse generated by said compression pulse generating means and outputting a level-compressed signal;
        sine wave generating means for generating a first sine wave having a frequency n times a frequency of the sync signal in synchronism with the sync signal generated from said second signal source;
        control data generating means for generating a second sine wave obtained by controlling a phase of the first sine wave generated by said sine wave generating means, said second sine wave including data representing a position at which the sync signal component is level-compressed;
        superposing means for superposing the second sine wave from said control data generating means on the audio intermediate frequency signal from said first signal source and outputting a superposed signal; and
        outputting means for outputting the level-compressed signal from said level compressing means and the superposed signal from said superposing means; and
    a receiving unit including:
        receiving means for receiving the level-compressed signal and the superposed signal output from said outputting means;
        detecting means for detecting the level-compressed signal and the superposed signal received by said receiving means and extracting the second sine wave from the superposed signal;
        compression position detecting means for discriminating a change in phase of the second sine wave extracted by said detecting means, detecting the position of the sync signal component compressed by said level compressing means based on a discrimination result, and outputting a detection signal;
        expansion pulse generating means for generating an expansion pulse at a timing determined on the basis of the second sine wave extracted by said detecting means and the detection signal output from said compression position detecting means; and
        level expanding means for expanding the level-compressed sync signal component of the level-compressed signal received by said receiving means in response to the expansion pulse generated from said expansion pulse generating means.

2. A system according to claim 1, further comprising sync separating means for supplying the sync signal of said video intermediate frequency signal to said compression pulse generating means and said sine wave generating means.

3. A system according to claim 1, wherein said level compressing means comprises gain control means for receiving the compression pulse from said compression pulse generating means and outputting a gain control signal, and gain switching means for receiving the gain control signal and compressing the sync signal component of the video intermediate frequency signal.

4. A system according to claim 1, wherein said control data generating means includes switching means for switching the phase of the first sine wave generated by said sine wave generating means.

5. A system according to claim 4, wherein said control data generating means further comprises timing data generating means for generating data for supplying a timing to switch the phase of the first sine wave, key data generating means for generating predetermined key data, an exclusive OR circuit for encoding the data for supplying the timing in accordance with the key data, and a data insertion circuit for receiving the encoded data to set a time interval in which the phase of the sync signal component is inverted, said switching means switching the phase in accordance with said set time interval.

6. A system according to claim 5, further comprising a formatter for outputting a data format of the key data generated by said key data generating means, an FSK modulator for performing frequency shift keying (FSK) modulation of the data format formatted by said formatter, and means for mixing the FSK-modulated key data with the level-compressed signal and the superposed signal output from said outputting means and outputting a mixed signal.

7. A system according to claim 6, further comprising a bandpass filter for extracting the second sine wave including data representing the position of the compressed sync signal in response to the signal detected by said detecting means, and first waveshaping means for waveshaping the second sine wave extracted by said bandpass filter.

8. A system according to claim 7, wherein said compression position detecting means comprises means for detecting the FSK-modulated key data from the mixed signal, second waveshaping means for waveshaping the detected key data, a key data extraction circuit for extracting only specific key data from the waveshaped key data, timing data extracting means for extracting the data representing the position of the compressed sync signal component from the second sine wave waveshaped by said first waveshaping means as descrambling timing data, exclusive OR means for decoding the data representing the position in accordance with the specific key data, and a reproduction circuit for reproducing the decoded and outputting said detection signal.

9. A system according to claim 8, wherein said timing data extracting means comprises series-connected first and second latch circuits, a first NAND gate receiving an output from said first latch circuit and an inverted output from said second latch circuit, a first counter capable of being preset, an inverter for inverting an output from said first NAND gate, an OR gate receiving outputs from said first NAND gate and first counter, a second NAND gate receiving outputs from said inverter and said first counter, a second counter receiving outputs from said OR gate and said second NAND gate, and a third NAND gate for presetting said first counter in response to outputs from said second counter and said inverter, said second counter outputting said data representing the position of the compressed sync signal component.

10. A system according to claim 7, wherein said expansion pulse generating means includes a timing detector for receiving the data representing the position of the compressed sync signal and the second sine wave from said first waveshaping means and determining a timing to generate the expansion pulse.

11. A system according to claim 1, wherein said level expanding means comprises a gain control circuit for outputting a control signal in response to the expansion pulse, and a gain switching circuit for receiving the control signal and expanding the compressed sync signal component of the video intermediate frequency signal.

12. A transmitting unit for a video signal scrambling system, comprising:
a first signal source for generating an audio intermediate frequency signal;
a second signal source for generating a video intermediate frequency signal including a sync signal;
compression pulse generating means for generating a compression pulse in synchronism with the sync signal of the video intermediate frequency signal generated from said second signal source;
level compressing means for level-compressing a sync signal component of the video intermediate frequency signal in response to the compression pulse generated by said compression pulse generating means and outputting a level-compressed signal;
sine wave generating means for generating a first sine wave having a frequency n times a frequency of the sync signal in synchronism with the sync signal generated from said second signal source;
control data generating means for generating a second sine wave obtained by controlling a phase of the first sine wave generated by said sine wave generating means, said second sine wave including data representing a position at which the sync signal component is level-compressed;
superposing means for superposing the second sine wave from said control data generating means on the audio intermediate frequency signal from said first signal source and outputting a superposed signal; and
outputting means for outputting the level-compressed signal from said level compressing means and the superposed signal from said superposing means.

13. A system according to claim 12, wherein said level compressing means comprises gain control means for receiving the compression pulse from said compression pulse generating means and outputting a gain control signal, and gain switching means for receiving the gain control signal and compressing the sync signal component of the video intermediate frequency signal.

14. A system according to claim 12, wherein said control data generating means comprises switching means for switching the phase of the first sine wave generated from said sine wave generating means and outputting said second sine wave in accordance with said control data, timing data generating means for generating data for supplying a timing to switch the phase of the first sine wave, key date generating means for generating predetermined key data, an exclusive OR circuit for encoding the data for supplying the timing in accordance with the key data, and a data insertion circuit for receiving the encoded data and generating the control data.

15. A system according to claim 14, further comprising a formatter for formatting a data format of the key data generated by said key data generating means, an FSK modulator for performing frequency shift keying (FSK) modulation of the key data having a data format formatted by said formatter, and means for mixing the FSK-modulated key data with the level compression signal and the audio intermediate frequency signal output from said outputting means and outputting a mixed signal.

16. A receiving unit for a video signal scrambling system, comprising:
receiving means for receiving a FSK-modulated key data, a signal obtained by level-compressing a sync signal component of a video intermediate frequency signal, and an audio intermediate frequency signal on which a sine wave having a frequency n times a frequency of a horizontal sync signal is superposed, the sine wave including data representing a position at which the sync signal is level-compressed;
detecting means for detecting the level-compressed signal and the audio intermediate frequency signal and extracting the sine wave;
compression position detecting means, responsive to said FSK-modulated key data, for discriminating a change in phase of the extracted sine wave, detecting the level-compressed sync signal component based on a discrimination result, and outputting a detection signal;
expansion pulse means for generating an expansion pulse at a timing determined on the basis of the sine wave extracted by said detecting means and the detection signal output from said compression position detecting means; and
level expanding means for expanding the level-compressed sync signal component in response to the expansion pulse generated from said expansion pulse generating means.

17. A system according to claim 16, wherein said compression position detecting means comprises means for detecting the FSK-modulated key data, waveshaping means for waveshaping the detected key data, a key data extraction circuit for extracting only specific key data from the waveshaped key data, timing data extracting means for extracting the data representing the position of the compressed sync signal from the sine wave as descrambling timing data, exclusive OR means for decoding the data representing the position in accordance with the specific key data, and a reproduction circuit for reproducing the decoded data.

18. A system according to claim 17, wherein said timing data extracting means comprises series-connected first and second latch circuits, a first NAND gate receiving an output from said first latch circuit and an inverted output from said second latch circuit, a first counter, an inverter receiving an output from said first NAND gate, an OR gate receiving outputs from said first NAND gate and first counter, a second NAND gate receiving outputs from said inverter and said first counter, a second counter receiving outputs from said OR gate and said second NAND gate, and a third NAND gate for presetting said first counter in response to outputs from said second counter and said inverter, said second counter outputting said data representing the position of the compressed sync signal component.

19. A system according to claim 17, wherein said expansion pulse generating means includes a timing detector for receiving the data representing the position of the compressed sync signal and the sine wave and determining a timing to generate the expansion pulse.

20. A system according to claim 17, wherein said level expanding means comprises a gain control circuit for outputting a control signal in response to the expansion pulse, and a gain switching circuit for receiving the control signal and expanding the compressed sync signal component of the video intermediate frequency signal.

* * * * *